3,443,893
RECOVERY OF COPPER AND CYANIDE VALUES FROM CUPROUS CYANIDES
Arthur O. Rogers, Lewiston, N.Y., assignor to E. I. du Pont de Nemours and Company, Wilmington, Del., a corporation of Delaware
No Drawing. Continuation-in-part of application Ser. No. 427,489, Jan. 22, 1965. This application May 16, 1968, Ser. No. 729,509
Int. Cl. C01g 3/10
U.S. Cl. 23—125           5 Claims

ABSTRACT OF THE DISCLOSURE

Copper and cyanide values are recovered from cuprous cyanide, which is isolated in extracting copper from a copper-bearing ore, by reacting the cuprous cyanide with aqueous sulfuric acid and free oxygen in the presence of a catalytic amount of chloride ions to form cupric ion and liberate hydrogen cyanide.

CROSS-REFERENCE TO RELATED APPLICATIONS

This application is a continuation-in-part of my copending application Ser. No. 427,489, filed Jan. 22, 1965, now abandoned.

BACKGROUND OF INVENTION

Field of invention

This invention relates to the recovery of copper and cyanide values from cuprous cyanide and, more particularly, to their recovery from solutions of complex cuprocyanides.

Prior art

A high percentage of the cupriferous minerals in certain ores may be isolated by extraction of the ore with soluble cyanide solutions, e.g., calcium, ammonium or sodium cyanide. The copper compounds are held in solution as complex cuprocyanides of the general formula $[Cu(CN)_{n+1}]^{-n}$, wherein $n$ is a small whole number; examples of such complex anions are $[Cu(CN)_2]^{-1}$ and $[Cu(CN)_3]^{-2}$. The solution can be separated from spent ore by conventional physical means, and the spent ore may then be discarded. For an economical separation, it is necessary to recover the copper content of the solution in a form suitable for processing to the metal or for other commercial uses. It is also necessary to recover a high proportion of the cyanide content of the solution in a form suitable for reconversion to soluble cyanide for recycle to the ore extraction step.

Acidification of the cuprocyanide solution, e.g., with sulfuric acid in an amount at least equivalent to its total cyanide content to a pH of about 2 to 4, precipitates the copper essentially quantitatively as cuprous cyanide, while converting the remainder of the cyanide to hydrogen cyanide. The latter can then be neutralized and re-used directly or, if preferred, can be distilled and absorbed in a suitable base. Methods of returning this portion of the cyanide to the ore extraction step are known to those skilled in the art.

Because of its extreme insolubility, the cuprous cyanide cannot be decomposed easily by ordinary economical methods, e.g., by heating with sulfuric acid. Cuprous cyanide is known to be soluble in hydrochloric acid when the latter is present in sufficient excess to form the cuprochloride anion and in sufficient concentration to keep the chloride in solution, i.e., prevent the hydrolysis of the cuprochloride ion with precipitation of cuprous chloride. This method is economically unattractive because of the large quantities of hydrochloric acid required and the extremely corrosive nature of the resulting solution. It would be highly desirable to have a process which permits recovery of copper in an acceptable form, e.g., as copper sulfate, and the recovery of hydrogen cyanide itself which could then be converted directly to a soluble cyanide for further use in extracting copper from the ore.

SUMMARY OF INVENTION

According to the present invention there is provided a process for recovering hydrogen cyanide simultaneously with converting the copper content from cuprous cyanide to cupric sulfate which comprises:

(1) Reacting the cuprous cyanide with an aqueous solution of sulfuric acid and free oxygen, contained in a gas passed into the solution, in the presence of chloride ions as a catalyst maintained at a concentration less than that which will result in the precipitation of cuprous chloride, to form cupric sulfate and hydrogen cyanide, and (2) Collecting gaseous hydrogen cyanide liberated by said reaction.

The cuprous cyanide is preferably obtained by acidification of an aqueous cuprocyanide solution.

Cupric sulfate is desirable in the recovery of copper since it forms stable solutions from which metallic copper is really obtained by electrolysis or by precipitation with iron. It can also be crystallized from solution as copper sulfate pentahydrate. The hydrogen cyanide formed can be made a soluble cyanide which can be used for the extraction of additional ore.

DETAILED DESCRIPTION OF INVENTION

The process is carried out by suspending cuprous cyanide in a solution of sulfuric acid containing chloride ion, the latter in a molar quantity substantially less than equivalent to the cuprous cyanide so that cuprous chloride does not precipitate, passing a free oxygen-containing gas such as air through the solution and into a solution of a suitable base. By this method, the sulfuric acid and oxygen, aided by the catalytic effect of chloride ion, convert the copper to soluble cupric ion with the simultaneous liberation of hydrogen cyanide. The latter is vaporized in the gas stream and carried into the basic solution, where it is absorbed to form the desired soluble cyanide. The reaction of the process can be shown as follows:

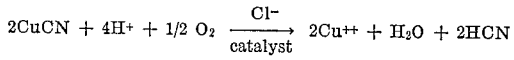

$$2CuCN + 4H^+ + 1/2\, O_2 \xrightarrow[\text{catalyst}]{Cl^-} 2Cu^{++} + H_2O + 2HCN$$

The reaction can be carried out at ambient temperature and pressure with good results. Higher temperatures, e.g., 90–100° C., are advantageous in accelerating both the reaction and the vaporization of hydrogen cyanide. Increased partial pressures of oxygen, which can be achieved either by operating at super-atmospheric pressure or by adding oxygen to the gas stream, will also accelerate the reaction. In general, it is preferred to use ordinary air at atmospheric pressure and a temperature of 70–100° C.

The volume of gas brought into contact with the solution is not critical. The gas may be introduced below the surface of the liquid through a perforated distributor both to provide good gas dispersion and to provide agitation. If no other provision is made, the requirement for agitation will determine the quantity of gas that is passed. If a mechanical arrangement is provided for agitation and gas reentrainment, the volume of gas is preferably regulated so that 1 to 10% of the oxygen content is consumed. By following this procedure, the hydrogen cyanide gas evolved is not excessively diluted and the reaction is not slowed appreciably by oxygen depletion.

The concentration of acid is not critical within the range which gives a strongly acidic solution since acidity is not controlling on reaction rate; for example, concentrations from 1 to 70% give excellent results. The final product should contain free acid, but not so much as to depress the solubility of cupric sulfate.

The source of chloride ion is not critical. Hydrochloric acid may be added, or, alternatively, a water-soluble chloride salt such as sodium chloride or ammonium chloride. Even calcium chloride may be used without severe disadvantage since chloride ion recycles in the process and the associated cation does not accumulate. The concentration of chloride ion should be less than that which will result in precipitation of cuprous chloride and for maximum economy, while still maintaining the catalytic effect of chloride ion, it is preferred that the chloride ion concentration be within the range of about 1 to 20 gm./liter of solution.

If desired, the treatment can be continued until all of the cuprous cyanide has been dissolved. Since the rate of reaction decreases with depletion of the cuprous cyanide, it is usually preferable to maintain a substantial quantity, e.g. 10 to 200 gm./liter, in the reaction mixture. It is frequently more convenient and economical in a large scale operation to operate continuously, with average composition within the reaction vessel remaining constant while reactants are added continuously and product is withdrawn continuously.

The acidic reaction mixture, containing dissolved cupric sulfate, is preferably freed of cuprous cyanide and any other suspended solids, e.g. by filtration or centrifugation, before it is processed further. The solution can then be treated to convert the dissolved copper to the metallic form or be cooled and filtered or centrifuged to isolate the cupric sulfate in the form of pentahydrate. In the latter case, the supernatant liquor containing sulfuric acid, chloride ion and a relatively small concentration of cupric ion may be recycled to the reaction system.

It is known that cyanide ion reacts readily with cupric ion to form cyanogen and also that it is subject to oxidation by molecular oxygen and to hydrolysis in acid media. It is thus a surprising and valuable discovery that the present process allows recovery of over 90% of the cyanide present in cuprous cyanide in the presence of cupric salts, sulfuric acid, chloride ions and free oxygen.

While the above explains the basic process, further modifications can be employed. For instance, if cyanide soluble sulfides are present in the ore, a portion of the copper will be precipitated as cuprous sulfide upon acidification of the cuprocyanide solution. It may be desired to process any cuprous sulfide separately from the cuprous cyanide. Separation may be accomplished by gradual acidification so that cuprous sulfide is precipitated preferentially before the bulk of the cuprous cyanide has precipitated, or cuprous sulfide can be preferentially floated out of the mixture of cuprous cyanide, cuprous sulfide and inert solids.

For reasons of economy, sulfuric acid is ordinarily preferred in acidifying the cuprocyanide solution. If the original cyanide solution is calcium cyanide, calcium sulfate will be precipitated with the cuprous cyanide, depending on the acid used. The precipitates are recovered by conventional physical means and the liquor remaining consisting primarily of a solution of hydrogen cyanide in water is suitable, after addition of lime and replenishment of the cyanide content by addition of hydrogen cyanide, for recirculation to the ore extraction step. At least a part of the cyanide content may be supplied by using the liquor to absorb the gaseous hydrogen cyanide liberated during the treatment of the precipitated cuprous cyanide.

It is also preferred that a cupric sulfate solution be used as a working solution even though it does not enter into the reaction. When a cupric sulfate solution is used, the cuprous cyanide and other precipitates which are recovered are added directly to a hot solution of the cupric sulfate containing catalytic chloride ions and sulfuric acid. Simultaneously a stream of free oxygen-containing gas is passed through the solution. The cuprous cyanide dissolves in the solution forming additional cupric sulfate with simultaneous formation of hydrogen cyanide which is swept out of the equipment by the flowing gas stream. Sulfuric acid is added to the cupric sulfate solution to replenish the acid consumed by reaction with cuprous cyanide.

Either a batch or a continuous process may be used in carrying out the process of this invention. When the cuprous cyanide is associated with substantial quantities of calcium sulfate, accumulation of inert solids in the reactor will be a limiting factor, and maximum rate of reaction will be achieved by a batch operation with the concentration of suspended cuprous cyanide being higher throughout the reaction period than in the finished reaction mixture.

If the cuprous cyanide residue separated from the hot liquor from the reaction vessel is not contaminated with inert material, it may be returned to the reaction vessel containing the hot cupric sulfate solution where attack upon it will resume. If the cuprous cyanide residue contains large amounts of calcium sulfate, it should be washed with water to remove adherent cupric sulfate solution, and these washings can be returned to the reaction vessel. The residual mixture of cuprous cyanide and calcium sulfate is then neutralized with lime, and brought into contact with a calcium cyanide solution, whereby the cuprous cyanide will go into solution in the form of calcium cuprocyanide. The calcium sulfate will remain undissolved, and can be separated by physical means and discarded. The calcium cuprocyanide solution is then recycled through the acidification and reaction steps previously described. The treatment of the mixture of calcium sulfate with cuprous cyanide may conveniently be carried out in the same equipment used for extraction of the ore. These operations may be carried out simultaneously, and the calcium sulfate can be discarded with the spent ore.

The following examples in which parts and percentages are by weight unless otherwise indicated illustrate the process of the invention. In these examples, the steps of extracting the copper from the ore by treatment with alkaline cyanide solution and precipitation of the cuprous cyanide by acidification are omitted. These steps may, of course, be carried out by the procedure previously described.

EXAMPLE 1

The treatment described below was carried out in a vertical cylindrical glass vessel 7 inches high and 43 mm. in diameter. The bottom of the vessel consisted of a fritted glas plate through which air was introduced. An inverted glass funnel 2½ inches high, somewhat smaller in diameter than the reaction vessel and supported on legs to allow free circulation of the surrounding liquid was placed in the vessel to serve as a draft tube and aid in agitating the reaction mixture. Gas and vapors escaping from the top of the vessel were passed through a solution of sodium hydroxide to absorb the liberated hydrogen cyanide, the quantity of which was determined periodically by titration. The vessel was charged with sulfuric acid (0.15 mole, diluted with water to 50 ml.), cuprous cyanide (0.1 mole, 9 gm.). A stream of air was passed through the apparatus at room temperature for 1 hour, during which time only 0.6% of the theoretical hydrogen cyanide was liberated. Sodium chloride (0.01 mole, 0.6 gm.) was then added to the mixture and treatment was continued. The rate of liberation of hydrogen cyanide was now found to be about 2% of theoretical per hour, showing the marked catalytic effect of chloride. The treatment was continued until the accumulation of cupric sulfate crystals interfered seriously with the flow of air and agitation of the mixture. It was found that 77% of the cuprous cyanide had dissolved and that the cyanide collected corresponded to 83% of that contained in the dissolved cuprous cyanide.

EXAMPLE 2

The apparatus described in Example 1 was charged with the same quantities of sulfuric acid, water, cuprous cyanide and sodium chloride. The reaction vessel was immersed in a bath of boiling water and air was introduced at the rate of 160 ml. per minute. Hydrogen cyanide was liberated initially at the rate of 24% of the theoretical quantity per hour. The treatment was continued for about 9 hours, during which time water was added periodically to the reaction mixture to maintain an approximately constant volume. At the end of this time all the cuprous cyanide had dissolved and the hydrogen cyanide collected amounted to 92% of the theoretical quantity.

EXAMPLE 3

A cuprous cyanide precipitate was prepared by dissolving commercial cuprous cyanide in an aqueous solution of sodium cyanide and adding sufficient sulfuric acid to precipitate all of the copper as cuprous cyanide. The cuprous cyanide was separated by filtration. A glass reaction vessel was constructed with an open end gas inlet tube reaching almost to the bottom of the vessel, through which the oxygen-containing gas was introduced during the reaction.

The reaction vessel was charged with 0.14 gram mole of cupric sulfate pentahydrate, 0.054 mole of sulfuric acid, 0.067 mole of cuprous cyanide, and 0.037 mole of hydrochloric acid. The mixture was diluted to 50 ml. volume with water. The reaction vessel was equipped with an electric resistance heater and warmed to about 90° C. while air was passed through the gas inlet tube at a rate of 160 ml. per minute. The top of the reaction vessel was connected to a scrubber filled with dilute sodium hydroxide solution, so that the gases leaving the reaction vessel were introduced below the surface of the caustic solution through a glass frit. The amount of cyanide accumulated in the caustic scrubber was measured at intervals by changing the scrubber solution and titrating the used caustic solution with a standardized solution of silver nitrate, using ammoniacal potassium iodide as an internal end point indicator. The initial rate of evolution of hydrogen cyanide was equivalent to reaction of about four percent of the suspended cuprous cyanide per hour.

In a second experiment oxygen was substituted for the air, with a flow rate of 160 ml. per minute. The rate of evolution of hydrogen cyanide was increased about 50%. A glass frit was then attached to the submerged end of the gas inlet tube, to improve gas dispersion. Oxygen was passed through the frit at a flow rate of 160 ml. per minute. The rate of hydrogen cyanide evolution was increased 18 fold, showing the importance of good gas-liquid contacting, and of good agitation.

What is claimed is:
1. A process for recovering hydrogen cyanide simultaneously with converting the copper content from cuprous cyanide to cupric sulfate which comprises:
   (1) reacting the cuprous cyanide with an aqueous solution of about 1 to 70% by weight sulfuric acid and free oxygen, contained in a gas passed into the solution, in the presence of chloride ions as a catalyst maintained at a concentration of about 1 to 20 gm. per liter of solution, to form cupric sulfate and hydrogen cyanide, and
   (2) collecting gaseous hydrogen cyanide liberated by said reaction.
2. The process of claim 1 wherein the cuprocyanide solution is acidified to a pH of between about 2 and 4 by adding sulfuric acid.
3. The process of claim 1 wherein the reaction is carried out at atmospheric pressure and at a temperature within the range of 70 to 100° C.
4. The process of claim 1 wherein the sulfuric acid and chloride ions are contained in a working solution of aqueous cupric sulfate.
5. In a process for extracting copper from finely divided copper-bearing ore the improvement which comprises:
   (1) contacting said ore with an aqueous cyanide solution to provide a solution containing cuprocyanide,
   (2) separating spent ore from the cuprocyanide solution formed in step (1),
   (3) precipitating cuprous cyanide from said cuprocyanide solution by acidifying said solution,
   (4) reacting the precipitated cuprous cyanide with a hot aqueous solution of 1 to 70% by weight of sulfuric acid and free oxygen, contained in excess air passed into said hot solution, in the presence of chloride ions as a catalyst at a concentration of from about 1 to 20 gm./liter, to form cupric sulfate and hydrogen cyanide,
   (5) collecting gaseous hydrogen cyanide liberated by said reaction, and
   (6) recovering the cupric sulfate contained in the resulting reaction mixture.

References Cited

UNITED STATES PATENTS 1,654,918  1/1928  Buchanan et al.
1,701,818  2/1929  Mills et al.

OTHER REFERENCES

Williams: The Chemistry of Cyanogen Compounds, J. and A. Church Ltd., London, 1915, p. 49.

OSCAR R. VERTIZ, Primary Examiner.

G. O. PETERS, Assistant Examiner.

U.S. Cl. X.R.

23—151; 75—106